June 21, 1960  C. J. CANTRELL  2,941,343
LOADING SYSTEM
Filed Oct. 27, 1958  3 Sheets-Sheet 1

INVENTOR.
CLAUDE J. CANTRELL,
BY Carl G. Ries
ATTORNEY

June 21, 1960  C. J. CANTRELL  2,941,343
LOADING SYSTEM
Filed Oct. 27, 1958  3 Sheets-Sheet 2
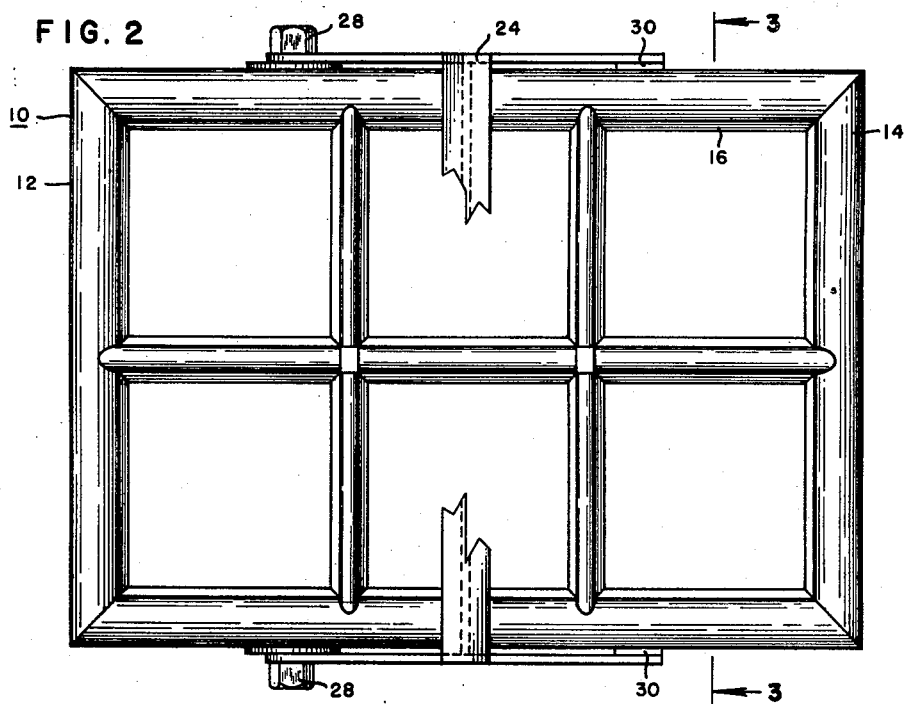
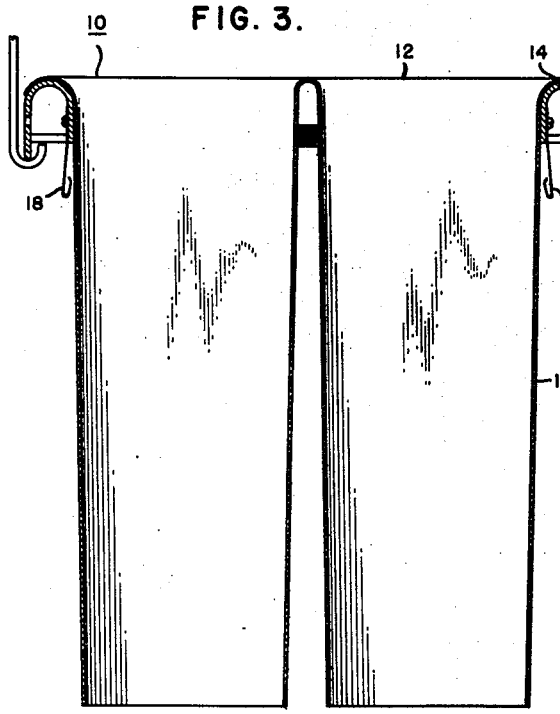
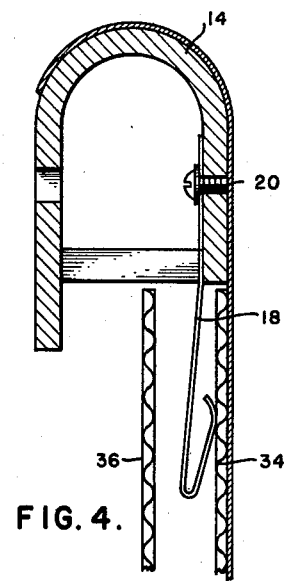
INVENTOR.
CLAUDE J. CANTRELL,
BY
ATTORNEY June 21, 1960 C. J. CANTRELL 2,941,343
LOADING SYSTEM
Filed Oct. 27, 1958 3 Sheets-Sheet 3
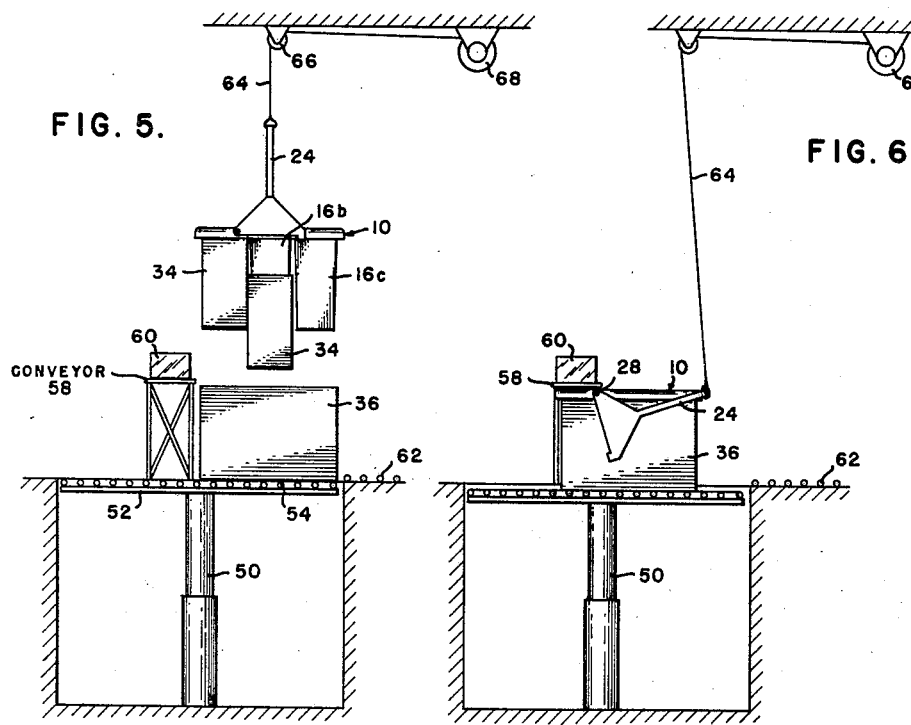
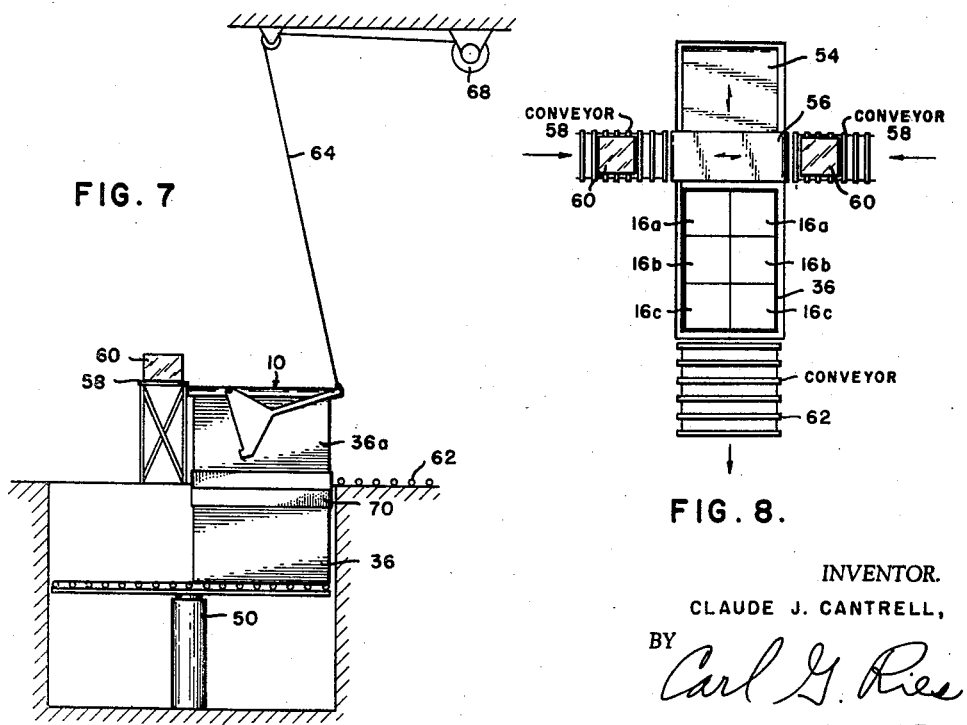
INVENTOR.
CLAUDE J. CANTRELL,
BY
ATTORNEY.

United States Patent Office 2,941,343
Patented June 21, 1960

2,941,343

LOADING SYSTEM

Claude J. Cantrell, Baytown, Tex., assignor, by mesne assignments, to Esso Research and Engineering Company, Elizabeth, N.J., a corporation of Delaware Filed Oct. 27, 1958, Ser. No. 769,666

2 Claims. (Cl. 53—263)

This invention relates to apparatus useful in the packaging of bales of unvulcanized rubbery isoolefin-diolefin copolymer.

In copending Cantrell application Serial No. 717,195, filed February 24, 1958 and entitled "Container," there is disclosed a multi-unit carton useful for the storage and transportation of a plurality of bales (i.e., units) of an isoolefin-diolefin copolymer of the "Butyl" rubber type, such container comprising upper and lower box members telescopically interconnected by means of a partition member, each box member containing a plurality of specially designed open-topped, bottom-closed tubular bale holders.

As is pointed out in the said copending application, a container of this nature provides a solution to the problem of storing and transporting large quantities of Butyl type rubber.

Thus, unvulcanized Butyl-type rubbers are tacky and dimensionally unstable (being subject to cold flow at ambient temperatures). It is therefore necessary in packaging uncured rubber of this nature to limit the weight of each particular bale (i.e., rectangular unit) to about 40 to 80 pounds in order to prevent undue mass distortion due to cold flow. It is customary to wrap each such bale of Butyl-type rubber with a sheet of a thin, flexible continuous self-sustaining film of a non-adherent polymer such as polyethylene, styrene-isobutylene copolymer, etc. Because of the cold flow properties of Butyl-type rubber, the rectangular bales are not dimensionally stable. Accordingly, in accordance with the disclosure of said copending application Serial No. 717,195, a plurality of open-topped bale holders are provided. Each bale holder is proportioned so as to be initially larger in length and breadth than the bale of Butyl-type rubber to be inserted therein. The height of each tubular bale holder is sufficient to permit the loading of a plurality (e.g., 4) of bales thereinto. The length of the tube holder is preferably such that it has a height less than the assembled height of the plurality of bales. Thus, at the time of loading, there is a loose fitting of the bales within the bale holders. However, cold flow of the rubber within each of the bales with the passage of time will cause the bales to distort into a snugly fitting configuration within the bale holders whereby the space initially present between the bales of Butyl-type rubber and the walls of the tube holders is filled.

While containers of the type disclosed in said copending application Serial No. 717,195 are well suited for Butyl rubber storage and transportation, serious problems are encountered in loading such containers due to the necessary structural features of the container and to the shape thereof. Thus, direct manual loading is difficult and awkward. In addition, the rough cardboard surfaces of the container tend to rupture or otherwise break the wrapping film. This has presented a serious problem.

In accordance with the present invention, the problems encountered in loading containers of the type disclosed in said copending application are overcome through the provision of a loading system comprising a vertically movable lower container support and an upper vertically movable tube support, the tube support comprising a frame, a plurality of vertically extending tubular guide members having a length substantially equal to the length of a tube to be filled, and means mounted on each of said guide members for releasably supporting a tube thereon.

The invention will be further illustrated with reference to the accompanying drawings wherein:

Fig. 2 is a top view of the tubular guide means shown in Fig. 1;

Fig. 3 is a side elevational view, partly in section, taken along the lines 3—3 of Fig. 2;

Fig. 4 is a fragmentary perspective side elevational view, to an enlarged scale, of a portion of the holder shown in Fig. 3;

Figure 1:
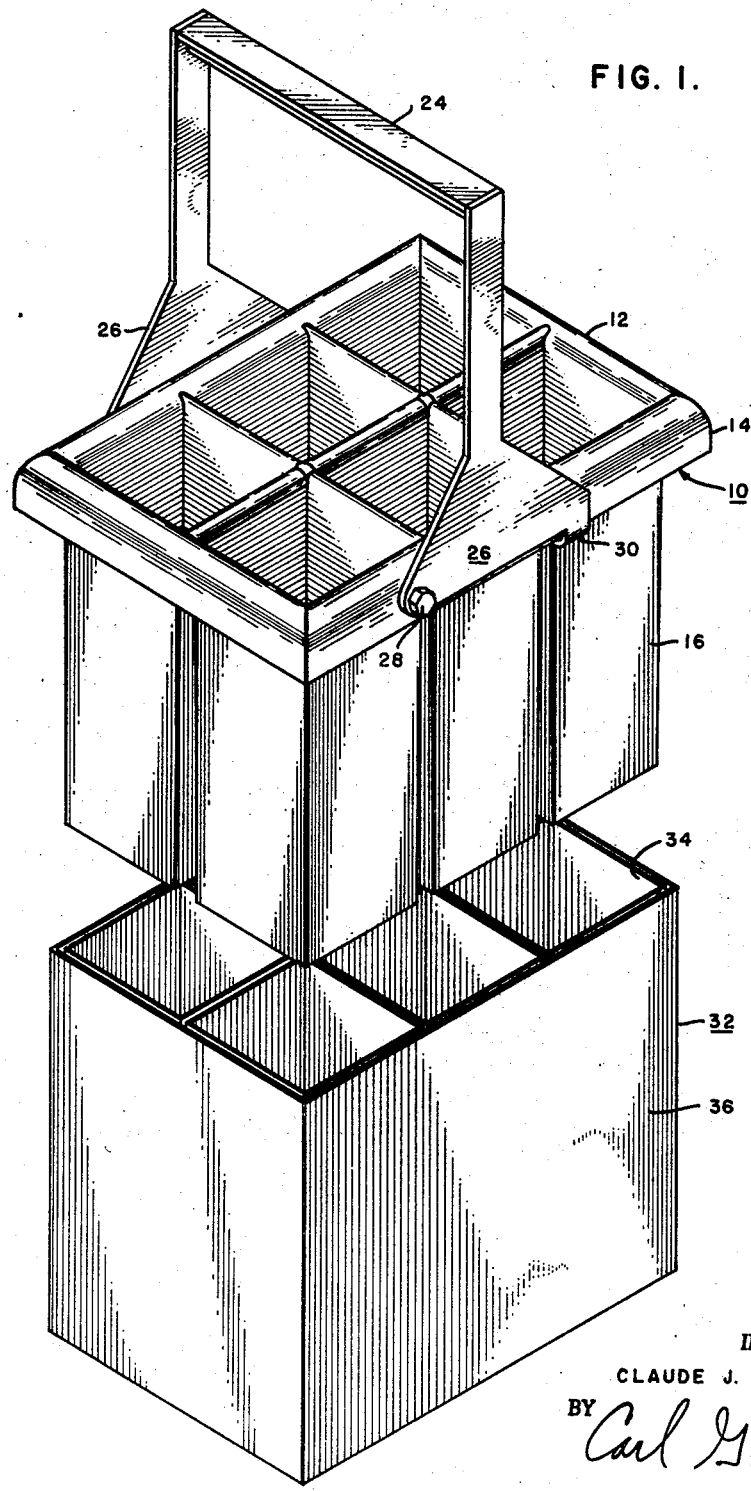
Fig. 1 is a perspective view of the tube support means showing the cooperative relationship between such support means and a container to be filled.

Figs. 5, 6, and 7 are schematic side elevational views, partly in section, showing the cooperative relationship between the tube holding means of Fig. 1 and a vertically movable container holding means and the manner in which a container is filled in accordance with the present invention; and Fig. 8 is a top view of a portion of the apparatus shown in Figs. 5–7.

Turning now to the drawings and, in particular, to Figs. 1 through 3, there is shown a tube support, designated generally by the numeral 10, comprising a rectangular frame member 12 having a reversely rolled outer edge 14. Mounted on the frame member 12 are a plurality of truncated tubular rectangularly sectioned guide members 16, the guide members 16 being open at both the bottom and the top thereof. The length of each of the guide members 16 should be substantially equal to the depth of a box member 36 for the bales of rubber (Fig. 5). As is more readily apparent from Figs. 2 and 3, each of the guide members 16 has tapered sides. Thus, the length and breadth of each of the guide members 16 at the bottom thereof should be substantially equal to the length and breadth of a bale of rubber to be inserted therein. The guide members 16 are of a slightly enlarged length and breadth at the top thereof. Means for releasably holding a tube, such as spring clips 18, is mounted to each of the guide members 16. The construction of the spring clip 18 is shown more clearly in Fig. 4.

With reference to Fig. 4, it will be noted that an inwardly biased spring clip 18 is suitably affixed to the frame member 12 by any suitable means such as a screw 20 whereby a wall of a tube member (to be described) is snugly and releasably held to the guide members 16.

The support means for the tube support 10 preferably comprises an eccentrically pivotally mounted yoke 24 to which a hoisting means of any desired construction may be affixed. Thus, the yoke 24 may be provided with triangularly shaped latch plates 26—26 and each of the latch plates 26 may be pivotally mounted to the frame 12 by any suitable means such as a pivot pin 28. A latching finger 30 is provided at the opposite end of the base plate 26.

With reference to Fig. 3, it will be seen that the latch finger 30 may comprise a U-shaped extension of the triangular plate 26 adapted to engage the rolled edge 14 of the frame member 12.

Returning now to Fig. 1, it will be observed that the length and width of the frame member 12 correspond substantially to the length and width of a box member (designated generally by the numeral 32) which is to be filled with bales of Butyl-type rubber. It will further be observed that each of the tubular members 16 is adapted to telescopically fit within an open-topped closed bottom tube 34 which is normally positioned within a box member 36.

When the tubes 34 are mounted to the guide members 16 by spring clips 18 in the described manner, the spring 18 will, on lowering of the tubes into the box 36 in a manner to be described, be intermediate the tube 34 and the box 36 (Fig. 4).

The manner in which a container is loaded with bales of Butyl-type rubber is disclosed more completely in Figs. 5 through 7.

Turning now to Fig. 5, there is shown a vertically movable ram 50 having supported on the upper end thereof a pedestal 52 provided with suitable means such as rollers 54 for supporting a container 36 in a manner to permit lateral movement of the container 36. With reference to Fig. 8, it will be noted that the width of the pedestal 52 may be substantially equal to the width of the container 36 but that the length of the pedestal 52 is substantially greater than the length of the container 36 whereby a bale holding table 56 may be positioned over one end of the pedestal 52. Suitable delivery means such as conveyors 58—58 are provided for delivering bales of Butyl-type rubber (60—60) to the table 56. A suitable conveyor 62 is provided for delivering containers 36 to the pedestal 52. It will be observed from Fig. 5 that yoke 24 may be supported as desired (e.g., the yoke 24 may be supported from a cable 64 passing about a pulley 66 leading to a power-operated drum 68).

At the commencement of a loading operation, an empty box member 36 is delivered to the pedestal 52 and at the same time open-topped, bottom closed tubular bale holders 34 are telescopically mounted on each of the guide members 16 for retention thereon by means of spring clips 18. Thus, in Fig. 5, a first bale holder 34 has been placed upon a first guide member, a second tubular bale holder 34 is in the act of being placed upon a second tubular guide member 16b, and a bale holder 34 has not as yet been provided for the guide member 16c. When a tubular bale holder 34 has been provided for each of the members 16, the assembly 10 is lowered by means of the cable 64 into the container 36 and the cable 64 is slacked off whereby the yoke 24 will pivot about the pin 28 and drop to an inactive non-blinding position, as shown in Fig. 6. As this is happening, bales 60 of Butyl-type rubber are delivered to the loading table 56 by way of conveyors 58—58. With the container 36 in the position shown in Fig. 8, bales are dropped through first guide members 16a—16a until the guide member is full. Thus, a plurality of bales (e.g., 4 to 5) may be placed in each of the guide means 16a—16a.

Thereafter, as shown more clearly in Fig. 6, the container 36 is partially moved under the loading table 56 so that the guide members 16a—16a are directly under the table 56 and so that the guides 16b—16b are adjacent the table for loading. The guides 16b—16b are loaded and thereafter the guides 16c—16c are brought into position adjacent the loading table 56. After the desired number of bales (e.g., 4) have been placed in each of the bale holders 34 of the container 36, the container 36 is returned to the position shown in Fig. 8 and the drum 68 is energized in order to bring the yoke 24 into a vertical position and in order to raise the assembly 10. When this is caused to happen, the weight of the rubber within each of the closed-bottom tubes 34 will cause each of the tubes 34 to be released from the spring clip 18 whereby the assembly 10 may be vertically withdrawn from the container 36.

With the assembly 10 vertically hoisted a suitable distance above the pedestal 52, the next operation is conducted. First, a partition member 70 is placed on the container 36. Thereafter, the ram 50 is actuated to lower the pedestal 52 to the position shown in Fig. 7. A second container 36a of a construction similar to the container 36 is then placed in the partition member.

Thereafter, a plurality of tubular bale holders 34 are positioned on the guide members 16 of the assembly 10 and the assembly 10 is again lowered into a loading position as shown in Figure 7. It will be observed at this time the ram 50 is lowered whereby the top of the assembly 10 is slightly below the level of the loading table 56.

Thereafter, the upper container 36a is filled with bales 60 of Butyl-type rubber in the described fashion. The assembly 10 is vertically withdrawn and a suitable cardboard cover member (not shown) is placed on the container 36a. As a concluding step, the pedestal 52 is raised to the general floor level and the now-loaded container is withdrawn by way of the conveyor 62. Thereafter, the operation is repeated.

Numerous advantages are obtained through the provision of the loading system of the present invention. Thus, the provision of the guide members 16 prevents rupture of the wrapping of each of the bales of Butyl-type rubber as it is dropped into the tubular bale holder 34. Due to the taper on each of the guide members 16, the bottom bale in each tube is accurately positioned and air is displaced at an increasingly slower rate as each bale of Butyl-type rubber falls through the guide members 16. As a result, each bale tends to be gently deposited in the desired position and is not brought to an abrupt rupturing-type stop.

The provision of a suitable tube support means on each of the guide means 16, such as spring clip 18, permits the cardboard tubes 34 to be rapidly and accurately positioned on each of the tube supports and likewise permits rapid and accurate insertion of the thus-"loaded" member 10 into box 36.

The eccentrically pivotally mounted yoke 24 provides a convenient means for vertically raising and lowering the tube support 10 while at the same time permitting the yoke member 24 to be moved by its own weight to a position (Figs. 6 and 7) which does not interfere with loading operations.

The provision of the loading table 56 is highly advantageous for several reasons. Thus, it provides a readily accessible storage area for receiving a plurality of the bales 60 during periods of time intermediate the actual loading steps. In addition, the bales 60 are brought to a most advantageous position for loading operations. Still further, the provision of a loading table 56 extending over the pedestal 52 permits lateral movement of each of the containers 36 during loading operations whereby the tubes 16 to be loaded are always adjacent the loading table.

It will be apparent to those skilled in the art that the above numerous advantages are representative of the many advantages obtainable in accordance with the present invention.

Having described my invention, what is claimed is:

1. An assembly useful for the insertion of a plurality of wrapped bales of a flowable rubbery isoolefin-diolefin copolymer and a plurality of rectangular open-topped bale holder cartons into a rectangular box member, said assembly comprising in combination a vertically movable pedestal having a length greater than the length of said box member, a loading table extending across said pedestal, conveyor means for delivering said wrapped bales of rubbery copolymer to said loading table, a carrier for a plurality of bale holder cartons, said carrier comprising a rectangular frame, a plurality of rectangular inwardly tapered bale holder carton supports mounted on said frame, each of said supports having a maximum cross-section at the top thereof and a minimum bottom cross-section substantially equal to the cross-section of a bale of said rubbery copolymer, each of said supports having a height substantially equal to the height of said box member, means carried by each of said supports adjacent the top thereof for releasably holding a bale holder carton thereon, and hoisting means mounted above and connectable with said frame for vertically moving said carrier.

2. An assembly useful for the insertion of a plurality of wrapped bales of a flowable rubbery isoolefin-diolefin copolymer into a plurality of rectangular open-topped bale cartons and into a rectangular box member, said assembly comprising, in combination, a vertically movable pedestal, a loading table adjacent said pedestal, conveyer means for delivering said wrapped bales of rubbery copolymer to said loading table, a carrier for a plurality of bale cartons, said carrier comprising a rectangular frame, a plurality of rectangular inwardly tapered bale carton holders supported on said frame, each of said bale carton holders having a maximum cross-section at the top thereof and a minimum cross-section at the bottom thereof substantially equal to the cross-section of a bale of said rubbery copolymer, each of said bale carton holders having a height substantially equal to the height of said box member, means carried by each of said bale carton holders adjacent the top thereof for releasably holding a bale carton thereon, a yoke pivotally mounted on said frame for pivotal movement from a first position above said frame to a second position beside said frame and hoisting means above said pedestal and connectable with said yoke for supporting said yoke in said first position during box positioning operations and for thereafter lowering said carrier into said box and moving said yoke to said second position.

References Cited in the file of this patent

UNITED STATES PATENTS

| | | |
|---|---|---|
| 2,182,187 | Wagner | Dec. 5, 1939 |
| 2,757,500 | Heinl et al. | Aug. 7, 1956 |